(12) United States Patent
Gray et al.

(10) Patent No.: US 12,435,180 B2
(45) Date of Patent: Oct. 7, 2025

(54) POLY(3-HYDROXYACID) POLYMERS FROM LONG-CHAIN EPOXIDES AND THEIR USES RELATED TO HOT MELT ADHESIVES

(71) Applicant: Bostik SA, Colombes (FR)

(72) Inventors: Steven D. Gray, Wauwatosa, WI (US); Darius Deak, Wauwatosa, WI (US)

(73) Assignee: Bostik SA, Puteaux (FR)

( * ) Notice: Subject to any disclaimer, the term of this patent is extended or adjusted under 35 U.S.C. 154(b) by 0 days.

(21) Appl. No.: 17/852,469

(22) Filed: Jun. 29, 2022

(65) Prior Publication Data
US 2023/0002549 A1    Jan. 5, 2023

Related U.S. Application Data

(60) Provisional application No. 63/216,031, filed on Jun. 29, 2021.

(51) Int. Cl.
*C08G 63/08* (2006.01)
*C08F 283/00* (2006.01)
(Continued)

(52) U.S. Cl.
CPC .......... *C08G 63/08* (2013.01); *C08F 283/004* (2013.01); *C08G 63/912* (2013.01);
(Continued)

(58) Field of Classification Search
None
See application file for complete search history.

(56) References Cited

U.S. PATENT DOCUMENTS

| | | |
|---|---|---|
| 3,021,313 A | 2/1962 | Cox et al. |
| 5,032,671 A | 7/1991 | Harper |

(Continued)

FOREIGN PATENT DOCUMENTS

| | | | |
|---|---|---|---|
| JP | 2017025138 A | * | 2/2017 |
| TW | 201730229 A | * | 9/2017 |

(Continued)

OTHER PUBLICATIONS

ACS Sustainalbe Chemistry & Engineering; "Sustainable Triblock Copolymers as Tunable and Degradable Pressure Sensitive Adhesives"; Hee Joong Kim et al—Chem Eng. 2020, 8, pp. 12036-12044.

(Continued)

*Primary Examiner* — Tae H Yoon
(74) *Attorney, Agent, or Firm* — Christopher R. Lewis

(57) ABSTRACT

A macromolecule comprises a ring-opened polymerized product of β-lactone monomers of formula I:

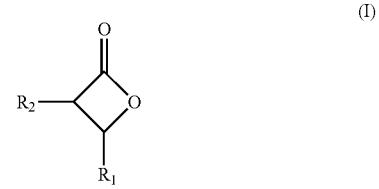

(I)

and having a structure of formula IA:

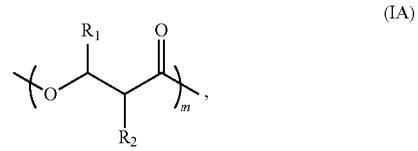

(IA)

wherein $R_1$ is an alkyl group having at least 8 carbon atoms. The macromolecule may be hydroxy-terminated, and may be copolymerized with other β-lactone monomers having (Continued)

different substituting groups and/or with higher lactone monomers. The macromolecule may be used as a reactant to form an alkoxysilane-terminated polymer, a polyurethane, or a (co)polyester, or may be used as an elastomeric midblock in a triblock copolymer having hard end blocks, such as polylactic acid. Such triblock systems demonstrate two discreet regions having properties similar to styrene block copolymers and are therefore suitable for use as hot melt or pressure-sensitive adhesives. In some embodiments, such triblock polymers may be entirely bio-sourced and compostable.

18 Claims, 2 Drawing Sheets

(51) Int. Cl.
  *C08G 63/91*  (2006.01)
  *C09J 167/04*  (2006.01)
(52) U.S. Cl.
  CPC ........ *C09J 167/04* (2013.01); *C08G 2230/00* (2013.01); *C09J 2301/302* (2020.08); *C09J 2301/304* (2020.08); *C09J 2467/00* (2013.01)

(56) References Cited

U.S. PATENT DOCUMENTS

| | | | |
|---|---|---|---|
| 5,648,452 A | 7/1997 | Schechtman et al. | |
| 5,994,478 A * | 11/1999 | Asrar ................ | C08G 18/4266 435/141 |
| 8,163,824 B2 | 4/2012 | Okazaki et al. | |
| 2007/0149724 A1 | 6/2007 | Pacetti et al. | |
| 2008/0146775 A1 * | 6/2008 | Uemori ................ | C08G 63/823 528/357 |
| 2010/0131064 A1 | 5/2010 | Redepenning | |
| 2011/0287102 A1 * | 11/2011 | Gunatillake ............ | C07C 69/40 528/80 |
| 2014/0275467 A1 * | 9/2014 | Jamiolkowski ........ | C08G 63/08 528/274 |
| 2014/0357410 A1 * | 12/2014 | Chou ...................... | B32B 27/22 473/374 |
| 2018/0155491 A1 * | 6/2018 | Sookraj .................. | C08G 63/08 |

FOREIGN PATENT DOCUMENTS

| | | | |
|---|---|---|---|
| WO | WO9636656 | | 11/1996 |
| WO | WO 99/10404 | * | 3/1999 |
| WO | WO0037119 A1 | | 6/2000 |
| WO | WO0077072 A1 | | 12/2000 |
| WO | WO 2005/061580 A1 | * | 7/2005 |
| WO | WO2013128175 A1 | | 9/2013 |
| WO | WO 2015/021254 A1 | * | 2/2015 |
| WO | WO21210608 A1 | | 10/2021 |
| WO | WO2021207394 A1 | | 10/2021 |
| WO | WO2022040040 A1 | | 2/2022 |
| WO | WO 2022/212124 A1 | * | 10/2022 |

OTHER PUBLICATIONS

Macromolecules 2000, 33, pp. 4690-4698—"Renewable Long-Chain Fatty Acids for Production of Biodegradable Medium-Chain-Length Polyhdroxyalkanoates (mcl-PHAs) at Laboratory and Pilot Plant Scales"; Kellerhals et al.
Polymer Chemistry—Royal Society of Chemistry "Tuning thermal properties and microphase separation in aliphatic polyester ABA copolymers"—Journal—The Royal Society of Chemistry 2015 Poly Chem 2015 6, pp. 1445-1453.
Biomacromolecules 2005, 6, pp. 580-586—"Preparation and Properties of a Noval Class of Polyhydroxyalkanoate Copolymers", Isao Noda, Phillip R. Green, Michael M. Satkowski and Lee A. Schechtman; 2005 American Chemical Society Published on Web Jan. 12, 2005.

* cited by examiner

POLY(3-HYDROXYACID) POLYMERS FROM LONG-CHAIN EPOXIDES AND THEIR USES RELATED TO HOT MELT ADHESIVES

CROSS-REFERENCE TO RELATED APPLICATION

This application claims the benefit under 35 U.S.C. § 119(e)(1) of U.S. patent application No. 63/216,031, filed on Jun. 29, 2021.

FIELD OF THE INVENTION

This invention relates to macromolecules and polymers based on such macromolecules, preferably bio-based and degradable or compostable macromolecules and polymers. Such macromolecules and polymers can be used as building blocks for block copolymers having characteristics suitable for use in a wide range of applications, including adhesives and especially hot melt adhesives and pressure sensitive adhesives.

BACKGROUND OF THE INVENTION

While bio-based and degradable or compostable polymers are well-known, few provide the proper properties to replace styrene block copolymers (SBc) currently used to formulate hot melt adhesive (HMA) and pressure-sensitive adhesive (PSA) products. Current bio-based materials are simply not well-suited to generate low modulus, elastomeric adhesives with high bonding performance. Currently, there is not a commercial material available that possesses the phase-separated morphology and displays the desired hard-soft behavior offered by SBc-based adhesives. As used herein, "bio-based" means that the material is made using sustainable sources and not petroleum-based products.

In *Poly. Chem.*, 2015, 6, 1445, the authors describe both the conversion of alkyl-substituted 1,2-epoxides to lactone species and the subsequent ring-opening polymerization to provide PLA-PHA-PLA triblock materials. A homopolymer of one long-chain alky lactone with R=n-$C_{10}H_{21}$ (referred to as β-TBL) is reported. It was made using benzyl alcohol and not a diol initiator; accordingly, the resultant polymer is not a diol. The polymerization kinetics of β-TBL are examined, but, unlike the Me, Et, and n-Bu derivatives described in the paper, little characterization is reported on the properties of the polymer nor is the analog of the triblock produced. Interestingly, the authors find shorter chain hydroxyl butyric acid (HBA) species to be miscible as Tg values for the HBA block are shifted at even low n values for PLA (n=10, m=100) and collapse to a single Tg at higher values (n=50, m=100) for the methyl derivative. Similar trends were seen for the ethyl derivative. The n-butyl derivative is largely unaffected even up to n=100 and m=75. At higher PLA levels (n=75 and m=100), the Tg collapses, implying the phases have some degree of miscibility. Also of note with regard to the novelty of the polymers proposed in this paper, the authors make the following statement:

> While both homopolymerization and copolymerization using β-BL are well understood, there has not yet been a study of the effect of changing the nature of the alkyl substituent in R lactone polymerization. To address this, we now report our efforts in expanding the synthesis of ABA block copolymers of L-lactide and β-lactones while also using several different alkyl chain lengths (methyl, ethyl and n-butyl) and their relationship to microphase separation.

In the above comment, β-BL refers to the R group shown below:

R = Me, Et, n-Bu

International Patent Publication No. WO 2013/128175 describes the ring-opening polymerization of lactone of a suitable cyclic ester monomer, optionally in combination with one or more suitable cyclic ester comonomers, in the presence of a compound of Formula 1 of that publication. The compound of Formula 1 is an aluminum-based catalyst of the class used to perform the ring opening polymerization in the literature reference cited above. It does report using this catalyst with cyclic esters in general and to produce various blocky architecture.

International Patent Publication No. WO 2000/077072 describes a catalyst system to make random copolymers of methyl lactone (R=Me) and a long-chain lactone (R=C-16) via a ring-opening polymerization process.

U.S. Pat. No. 5,648,452 relates to a method of preparing a polyester comprising polymerizing at least one β-substituted-β-propiolactone in the presence of an initiating amount of alkylzinc alkoxide in bulk or in solvent. Example 12 reports an isotactic random copolymer made from chiral methyl (R=Me) and a long-chain lactone (pentadecyl, R=$C_{15}H_{31}$). The copolymer composition on a molar basis is 95% Me-lactone and 5% $C_{15}$-lactone with Mn=146,000 g/mol and Mw=210,000 g/mol. It possesses a Tm of 145° C.

In *ACS Sustainable Chem. Eng.*, 2020, 8, 12036, the authors describe the use of diol initiated ring-opening polymerizations that lead to PLA-polyester-PLA triblocks. The midblock is formed from a Cis-alkyl-substituted caprolactone, a 7-membered ring, that serves as the soft midblock when polymerized.

SUMMARY OF THE INVENTION

There remains a need to provide biobased and degradable or compostable macromolecules or polymers which provide the proper properties to replace styrene block copolymers (SBc) currently used to formulate hot melt adhesive (HMA) and pressure-sensitive adhesive (PSA) products. Such bio-based materials would ideally be well-suited to generate low modulus, elastomeric adhesives with high bonding performance.

In order to meet at least some of the needs described herein, an embodiment of the present invention provides macromolecule comprising a ring-opened polymerized product of β-lactone monomers of formula I:

and having a structure of formula IA:

(IA)

and, optionally, β-lactone monomers of formula II:

(II)

and having a structure, when the β-lactone monomers of formula II are present, of the formula IIA:

(IIA)

and, optionally, higher lactone monomers of formula III:

(III)

(IIIA)

wherein: (1) at least one of: $R_1'$, if present, is not the same as $R_1$ or $R_2'$, if present, is not the same as $R_2$; (2) $R_2$ is hydrogen or an alkyl group or a substituted alkyl group; (3) $R_2'$, if present, is hydrogen or an alkyl group or a substituted alkyl group; (4) a, if the higher lactone monomers of formula III are present, is at least 3, preferably from 3 to 8, and more preferably from 4 to 7; (5) either m alone or the total of m and m', if the β-lactone monomers of formula II are present, or the total of m and p, if the higher lactone monomers of formula III are present, is between 10 and 10,000, preferably between 20 and 5,000; and (6) one of the following:

a. the macromolecule is not hydroxy-terminated, the β-lactone monomers of the formula II are present, and $R_1$ and $R_1'$ are each independently an alkyl group having at least 8, preferably between 8 and 26, more preferably between 8 and 22 carbon atoms;

b. the macromolecule is not hydroxy-terminated, the β-lactone monomers of the formula II are not present, and $R_1$ is an alkyl group having at least 11, preferably between 12 and 26, and most preferably between 14 and 22 carbon atoms; and c. the macromolecule is hydroxy-terminated and $R_1$ and $R_1'$, if present, are each independently an alkyl group having at least 8, preferably between 8 and 26, more preferably between 8 and 22 carbon atoms.

For completeness, in (5) above, it should be noted that the sum of m, m', and p, if the (β-lactone monomers of formula II and the higher lactone monomers of formula III are present, may also be between 10 and 10,000, preferably between 20 and 5,000. The values of m' and p may have ranges of values such that these overall ranges are achieved (e.g, m' would be between 10-m and 10,000-m when the β-lactone monomers of formula II are present but the higher lactone monomers of formula III are not present).

According to another embodiment of the invention, a method for making a silane-modified, moisture curable oligomer or polymer comprises reacting a hydroxy-terminated macromolecule according to any embodiment as described herein with a siloxide to form an alkoxysilane-terminated oligomer or polymer.

According to another embodiment of the invention, a method for making a polyurethane comprises reacting a hydroxy-terminated macromolecule according to any embodiment as described herein with an isocyanate.

According to another embodiment of the invention, a method for making a (co)polyester comprises reacting a hydroxy-terminated macromolecule according to any embodiment as described herein with a diacid or diester.

Another embodiment of the invention is a triblock copolymer having an A:B:A backbone, wherein block B comprises the residue of a hydroxy-terminated macromolecule according to any embodiment as described herein and block A is a residue of a polymer selected from the group consisting of polylactic acid, polycaprolactone, polystyrene, polyhydroxybutyrates, PMMA, or polyamides. Preferably, block A is a residue of polylactic acid.

According to another embodiment of the invention, a hot melt adhesive comprises the triblock copolymer of any embodiment described herein; the silane-modified, moisture curable polymer made from a method of any embodiment described herein; the polyurethane made from a method of any embodiment described herein; or the (co)polyester made from a method of any embodiment described herein.

According to another embodiment of the invention, a pressure sensitive adhesive comprises the triblock copolymer of any embodiment described herein; the silane-modified, moisture curable polymer made from a method of any embodiment described herein; the polyurethane made from a method of any embodiment described herein; or the (co)polyester made from a method of any embodiment described herein.

BRIEF DESCRIPTION OF THE DRAWING

FIGS. 1-7 show various structures and reaction schemes relevant to embodiments of the present invention, in which:

DETAILED DESCRIPTION OF THE INVENTION

The present invention may be understood more readily by reference to the following detailed description of certain embodiments of the invention and the working examples.

As used herein, the term "residue" (also referred to herein as a polymerized product) shall mean the product of a reactant, such as the moiety remaining from a monomer in a polymer or from a polymer in a block copolymer wherein that polymer is one of the blocks of the block copolymer. For example, the residue of a diol initiator HO-D-OH is the moiety -O-D-O-.

As used herein, the term "macromolecule" shall mean an oligomer or polymer, namely a substance that has a molecular structure consisting mostly or entirely of two or more similar or identical units bonded together.

According to an embodiment of the invention, a macromolecule comprises a ring-opened polymerized product of β-lactone monomers of formula I:

(I)

and has a structure of formula IA:

(IA)

wherein: (1) $R_2$ is hydrogen or an alkyl group or a substituted alkyl group; (2) m is between 10 and 10,000, preferably between 20 and 5,000 and (3) one of the following:
a. the macromolecule is not hydroxy-terminated and $R_1$ is an alkyl group having at least 8, preferably between 8 and 26, more preferably between 8 and 22 carbon atoms;
b. the macromolecule is not hydroxy-terminated and $R_1$ is an alkyl group having at least 11, preferably between 12 and 26, and most preferably between 14 and 22 carbon atoms; and
c. the macromolecule is hydroxy-terminated and $R_1$ is an alkyl group having at least 8, preferably between 8 and 26, more preferably between 8 and 22 carbon atoms.

Figures 1, 2:
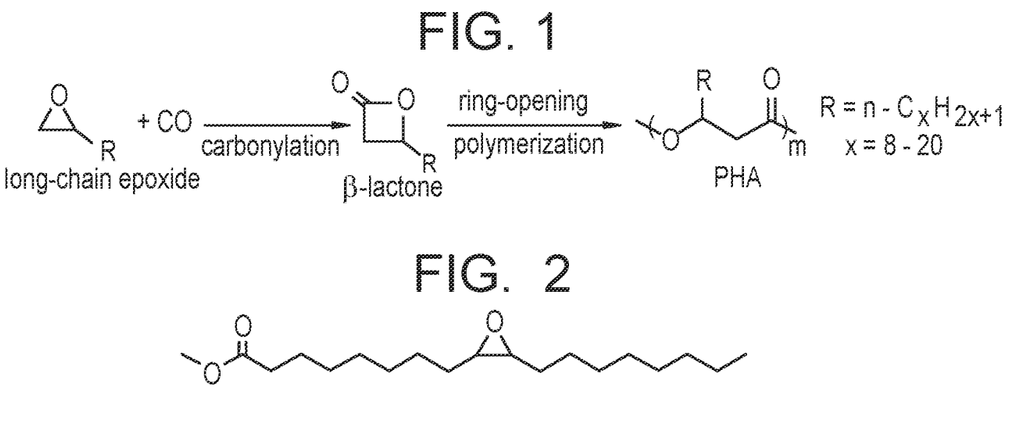
FIG. 1 shows a general route to a polymerized lactone according to the present invention.
FIG. 2 shows the structure of Vikoflex 7150 epoxide, an example of a bio-based internal epoxide that may be used as a starting material in accordance with the present invention.

Macromolecules of the present invention are derived from long-alkyl chain epoxides. Exemplary epoxide starting materials needed to make the lactone species of formula I above are commercially available from Cargill and sold under the brand name of Vikolox. Suitable examples of these 1,2-long-chain epoxides include: Vikolox 10 (R=n-octyl), Vikolox 12 (R=n-decyl), Vikolox 14 (R=n-dodecyl), Vikolox 16 (R=n-tetradecyl), and Vikolox 18 (R=hexadecyl). The inventive materials are produced by performing a carbonylation reaction on a long-alkyl chain epoxide to generate a β-lactone. The lactone subsequently undergoes a ring opening polymerization to yield a polyester in the poly(hydroxyalkonaote), PHA, family, as shown in FIG. 1. Use of such commercially-available epoxides as starting materials offers a viable alternative to other methods for making PHA-based polymers that do not have such a readily available source of raw materials.

The lactones of formulas I or II can be made from a starting epoxide by carbonylation. For example, an epoxy (such as 1,2-epoxyhexadecane) and one or more catalysts (such as ClCr (TTP) and dicobalt octacarbonyl) may be dissolved in a solvent in a pressure-rated reaction vessel. The vessel can then be flushed with carbon monoxide and heated to carbonylate the epoxide. Carbonylation of internal epoxides can also be performed to give di-substituted lactones. FIG. 2 shows an example of one such internal epoxide produced by Arkema and sold under the trade name Vikoflex 7150. This material is derived from canola oil and similar epoxides derived from bio-renewable feedstocks are of particular interest as few bio-based and biodegradable polymers with a rubber-like properties are currently commercially available.

The macromolecule of formula IA, which is a homopolymer, meets one of the following conditions:
a. the macromolecule is not hydroxy-terminated and $R_1$ is an alkyl group having at least 8, preferably between 8 and 26, more preferably between 8 and 22 carbon atoms;
b. the macromolecule is not hydroxy-terminated and $R_1$ is an alkyl group having at least 11, preferably between 12 and 26, and most preferably between 14 and 22 carbon atoms; or
c. the macromolecule is hydroxy-terminated and $R_1$ is an alkyl group having at least 8, preferably between 8 and 26, more preferably between 8 and 22 carbon atoms.

As used herein, the term "alkyl" group is intended to mean straight chain alkyl groups, branched alkyl groups, and cycloalkyl groups and to exclude aromatic groups. In addition, $R_2$ in formula IA above is hydrogen, an alkyl group, or a substituted alkyl group. As used herein, a "substituted alkyl group" is intended to mean an alkyl group which is substituted in any way, such as by a heteroatom (e.g., sulfur, nitrogen, or oxygen) taking the place of a carbon atom, a halide taking the place of a hydrogen atom, or with some functional group (e.g., an ester group, a (meth)acrylate, a urethane linkage, or a urea linkage) either as a branch to the alkyl group, a terminus of the alkyl group, or as part of the alkyl chain. In one example, the epoxide of FIG. 2 is used to produce the corresponding lactone, via carbonylation, such that $R_1$ is $C_8H_{17}$ and $R_2$ is methyl ester of epoxidized canola oil.

Figures 3, 4:
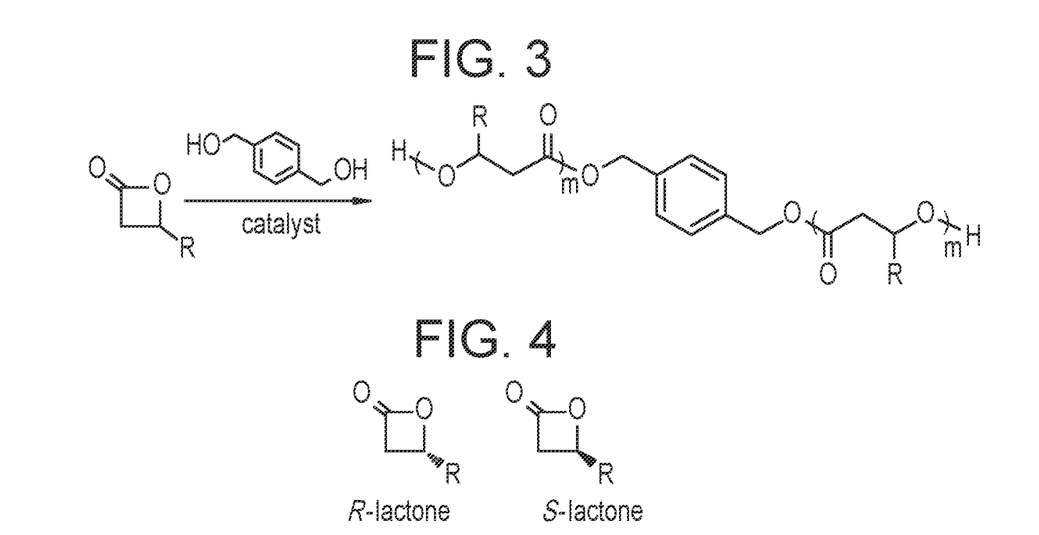
FIG. 3 shows a route to a hydroxy-terminated poly (hydroxyalkonaote) starting from a lactone in accordance with the present invention.
FIG. 4 shows the structure of two potential chiral lactone monomers, namely an R- and S-enantiomer.

The end groups of the macromolecule according to the invention may be controlled depending on the ring-opening polymerization process employed. In an embodiment of the invention, the macromolecule is hydroxy-terminated and $R_1$ is an alkyl group having at least 8, preferably between 8 and 26, more preferably between 8 and 22 carbon atoms. To achieve this, the ring-opening transesterification polymerization (ROTEP) is done using a diol-initiator, such as 1,4-benzenedimethanol, along with a metal catalyst to provide hydroxy-terminated polymers, as shown in FIG. 3. More specifically, 1,4-benzenedimethanol initiator, Sn(octyl)$_2$ catalyst, and the β-lactone of formula I can be dissolved in a solvent and placed in a pressure-rated reaction vessel. The sealed vessel can then be heated under sufficient conditions to polymerize the β-lactone monomer. The vessel can then be cooled to room temperature and the reaction product can then be precipitated using another solvent to provide poly(β-lactone). The copolymerization of the β-lactone of formula I along with one or both of the other lactone monomers shown in formulas II or III would be substantially similar. Alternatively, a long-chain diol, such as a hydroxy-terminated macromolecule or polymer like polyethylene glycol or polypropylene glycol, could also be employed as an initiator to impart flexibility to the main polymer chain. In these embodiments using a diol as an initiator, the resulting macromolecule is also a diol having the formula IB:

(IB)

In another embodiment of the invention, the macromolecule is hydroxy-terminated and has three or more hydroxyl groups. In such embodiments, the macromolecule is a polyol having three or more hydroxyl groups and has the following formula IC:

(IC)

wherein BA is a hydrocarbon residue from a polyol initiator having three or more hydroxyl groups and b is at least 3 and preferably between 3 and 6. Each moiety is bonded to the initiator residue. In such embodiments, the initiator is a triol, such as glycerol, or has more than three hydroxyl groups. For example, using glycerol as the initiator would result in a trifunctional macromolecule, with each moiety bonded to the glycerol residue, —OCH$_2$C(CH$_2$O—)HCH$_2$CH$_2$O—. Embodiments of the invention include macromolecules in which both or all terminal groups are hydroxyl groups or less than all of the terminal groups are hydroxyl terminated. In the embodiments stating that the macromolecule is not hydroxy-terminated, none of the terminal groups of the macromolecule are hydroxyl groups.

Polymers can be made from racemic mixtures of lactones of formula I above, and the resulting polymers would be homopolymers. Alternatively, the stereochemistry can be preserved during the carbonylation reaction of the epoxides to provide chiral lactone monomers starting from enantiomerically-pure epoxides, as shown in FIG. 4. Ring-opening polymerization on mixtures of the chiral materials can be performed to control the tacticity—and in turn—the thermal and mechanical properties of the final product. It is expected, however, that use of a single enantiomerically pure monomer alone will yield isotactic PHA species like those produced by bacteria from biomasses and provide higher than desired melt points and poor elastomeric behaviour (high yield stress and low elongation at yield). In an embodiment of the invention, the macromolecule is made from β-lactone monomers of formula I consisting essentially of, or consisting of, a racemic mixture of the R-lactone and S-lactone stereoisomers. In another embodiment of the invention, the macromolecule is made from β-lactone monomers of formula I consisting essentially of, or consisting of, the R-lactone stereoisomer. In another embodiment of the invention, the macromolecule is made from β-lactone monomers of formula I consisting essentially of, or consisting of, the S-lactone stereoisomer. In this context, the language "consisting essentially of" is intended to describe a monomer which is substantially enantiomerically pure and the language "consisting of" is intended to describe a monomer which is enantiomerically pure.

The inventive polymers may be homopolymers made solely from the β-lactone monomers of formula I as described above or, in other embodiments, could be copolymers made from one or more other types of monomers. By using a mixture of other monomers, including other lactone monomers, the mechanical and thermal properties for the end use application of the macromolecule could be tailored. In one such embodiment, the macromolecule comprises a ring-opened polymerized product of the β-lactone monomers of formula I and β-lactone monomers of formula II:

(II)

and has a structure of the formula IIA:

(IIA)

wherein: (1) at least one of: $R_1'$ is not the same as $R_1$ or $R_2'$ is not the same as $R_2$; (2) $R_2$ is hydrogen or an alkyl group or a substituted alkyl group; (3) $R_2'$ is hydrogen or an alkyl group or a substituted alkyl group; (4) the total of m and m' is between 10 and 10,000, preferably between 20 and 5,000; and (5) $R_1$ and $R_1'$ are each independently an alkyl group having at least 8, preferably between 8 and 26, more preferably between 8 and 22 carbon atoms.

As with the homopolymer described above, the macromolecule may be hydroxy-terminated or not. When the macromolecule of the embodiment made also from the β-lactone monomers of formula II is a diol, and therefore made from an initiator which is a diol, it has the following formula IIB:

(IIB)

wherein D is a hydrocarbon residue from a diol initiator. The macromolecule is a random copolymer.

Similar to the homopolymer embodiment described above, in the embodiment of the invention in which the β-lactone monomers of formula II are present, the macromolecule may be also be a polyol having three or more hydroxyl groups having the following formula IIC:

(IIC)

wherein BA is a hydrocarbon residue from a polyol initiator having three or more hydroxyl groups and b is at least 3 and preferably between 3 and 6.

In the embodiment of the invention in which the β-lactone monomers of formula II are present, the ratio of m to m' may vary over a wide range, 1:99 and 99:1, preferably 1:9 to 9:1.

According to another embodiment of the invention, higher lactone monomers of formula III below are used with the β-lactone monomers of formula I, either alone or along with the β-lactone monomers of formula II. In this embodiment, the macromolecule comprises a ring-opened polymerized product of the β-lactone monomers of formula I and higher lactone monomers of formula III:

(III)

wherein $X=(CH_2)_a$, or and has a structure of the formula IIIA.

(IIIA)

wherein: (1) $R_2$ is hydrogen or an alkyl group or a substituted alkyl group; (2) a is at least 3, preferably from 3 to 8, most preferably from 4 to 7; (3) the total of m and p is between 10 and 10,000, preferably between 20 and 5,000; and (4) $R_1$ is an alkyl group having at least 8, preferably between 8 and 26, more preferably between 8 and 22 carbon atoms.

As with the embodiments described above, the macromolecule may be hydroxy-terminated or not. When the macromolecule of the embodiment made also from the higher lactone monomers of formula III is a diol, and therefore made from an initiator which is a diol, it has the following formula IIIB:

(IIIB)

wherein D is a hydrocarbon residue from a diol initiator.

Similar to the embodiments described above, in the embodiment of the invention in which the higher lactone monomers of formula III are present, the macromolecule may be also be a polyol having three or more hydroxyl groups having the following formula IIIC:

wherein BA is a hydrocarbon residue from a polyol initiator having three or more hydroxyl groups and b is at least 3 and preferably between 3 and 6.

In the embodiment of the invention in which the higher lactone monomers of formula III are present, the ratio of m to p may vary over a wide range, 1:99 and 99:1, preferably 1:9 to 9:1.

Figure 5:
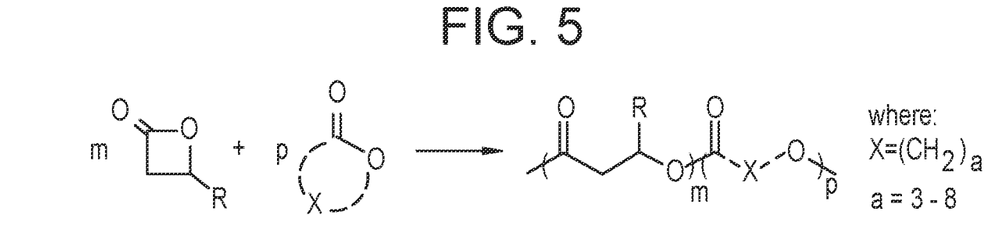
FIG. 5 shows the structure of copolymers of long-chain β-lactones with γ (a=3), δ (a=4), ε (a=5), and higher lactones (a>5)

Copolymerization of the β-lactone monomers of formula I and the higher lactone monomers of formula III, such as ε-caprolactone, can be carried out in an inert atmosphere by combining an initiator (such as 1,4-Benzenedimethanol), a catalyst (such as $Sn(octyl)_2$ catalyst), and the β-lactone and ε-caprolactone monomers in a suitable molar ratio, such as a ratio β-to-ε lactone of 2:1. The reactants can be dissolved in a solvent then heated in a pressure-rated reaction vessel under conditions to cause copolymerization. After cooling the vessel to room temperature, the reaction product can be precipitated by using a solvent to provide the copolymer, such as poly(β-lactone-co-ε-caprolactone). Copolymerization of the long-chain β-lactones may also be performed with other larger-ring heterocyclic comonomers such as γ-(five carbon) and δ-(six carbon), and higher lactones, as shown in FIG. 5, in a similar manner. Inclusion of these comonomers as well as their derivatives with pendant alkyl groups can be performed to alter the thermal and hydrolytic stabilities as well as the overall crystallinity and mechanical properties of the inventive polymers.

Introduction of some stereoregularity (tacticity) in the mid-block is also a possible option to optimize the inventive PHA performance. Bacteria/biomass derived long chain PHA's are isotactic and this more regular array of side groups gives them crystalline behavior. For example, relatively long-chain isotactic PHAs (R=10 and 12) display Tm values in the range of 40 to 80° C. These systems may display more crystallinity than desired for the reasons described above. Nevertheless, introduction of some degree of crystallinity using judiciously selected mixtures of enantiomerically-pure or enriched lactone monomers could be employed to target materials with fairly low crystallinity with Tm values in the range of 20-40° C., potentially allowing for tackifier free systems to be developed that display creep resistance. If the overall crystallinity is low and these materials can be plasticized to effectively depress the crystallinity even further, the materials might function well as PSA's where tack is required at room temperature.

The introduction of some lower chain alkyl moieties into the PHA backbone (R=octyl or less) could serve a similar role to change thermal behaviour as is proposed by introducing tacticity above.

PHA polymers could be generated using mixtures of long-chain lactone monomers, for example a random copolymer of $C_8$ and $C_{18}$ n-alkyls substituents. Although this likely will not change the thermal behaviour dramatically as atactic PHA copolymers, it is potentially a method to vary the van der Waals bonding forces exhibited by adhesive made from the inventive polymers, copolymers, and block copolymers. Such variations could allow the adhesives to be designed to selectively fail adhesively or cohesively.

In accordance with an embodiment of the invention, the β-lactone monomers of formula I are non-functionalized and, preferably, the β-lactone monomers of formula II are also non-functionalized and/or the higher lactone monomers of formula III are also non-functionalized. As used herein, the term "non-functionalized" means that the monomer does contain any groups that would polymerize or otherwise react upon application of heat, uv-curing, and/or catalysis, other than the lactone group itself or its precursor which forms the polymer backbone. Thus, embodiments using monomers which are non-functionalized would not be suitable to make cross-linkable, curable adhesives. Monomers in accordance with this embodiment (i.e., that are non-functionalized) may nonetheless contain linkages, such as ester, urethane, ether, amide, or other linkages, and still be deemed 'non-functionalized'. In other embodiments, at least one of or all of the β-lactone monomers of formula I, the β-lactone monomers of formula II, and the higher lactone monomers of formula III are functionalized and thereby contain at least one functional group, such as (meth)acrylates, that could cross-link in situ.

One aspect of the invention is to develop elastomeric, rubber-like polymers. From a mechanical property standpoint, the inventive PHA polyesters are designed to display low storage modulus values. In embodiments of the invention, the macromolecules described above have at least one, preferably at least two, more preferably at least three, still more preferably at least 4, and most preferably all five of the following characteristics:

a. A storage modulus of $G'<10^6$ Pa at 20° C.;
b. Elongation at break values of between 100-3,000%;
c. Low melting points (Tm<60° C.);
d. No or low crystallinity (as evidenced by DSC); and
e. A glass transition temperature, Tg, of between about −100 to 60° C.

The rheology of a given hot melt adhesive can be determined using a TA Instruments rheometer, such as an Ares 3 model, consistent with Dynamic Temperature Testing described in ASTM D4440-01. A temperature step procedure may be used to determine the storage modulus, G', at various temperatures. The instrument may be set to a frequency of 10 radians per second, the sample may be melted at 170° C., and the temperature may be reduced to −40° C. at 10° C. per minute. The parallel plates may have a 25 mm diameter and a 1.6 millimeter gap. As used herein elongation at break values are determined in accordance with ASTM D638. The melting point, Tm, is determined according to ASTM D7138 using DSC, and glass transition temperature is determined in accordance with according to ASTM D3417.

Such low modulus PHA polyester-diols or triols (or polyesters of higher hydroxyl functionality) could find utility in a variety of applications. For example, macromolecules of the present invention which are diols can be reacted with diacids or diesters to make (co)polyesters, or they can be reacted with diisocyanates to polyurethanes. Similarly, they could be reacted with acid-terminated polyesters or NCO-end capped polyurethanes to provide species with compostable/biodegradable elastomeric blocks. Another method of the invention comprises reacting the diol macromolecules (or macromolecules of higher functionality) of the present invention with siloxides to form alkoxysilane-terminated oligomer or polymer, for example having —Si(OMe)$_3$ and —Si(OEt)$_3$ end groups, to provide moisture curable polymers.

Figure 6:
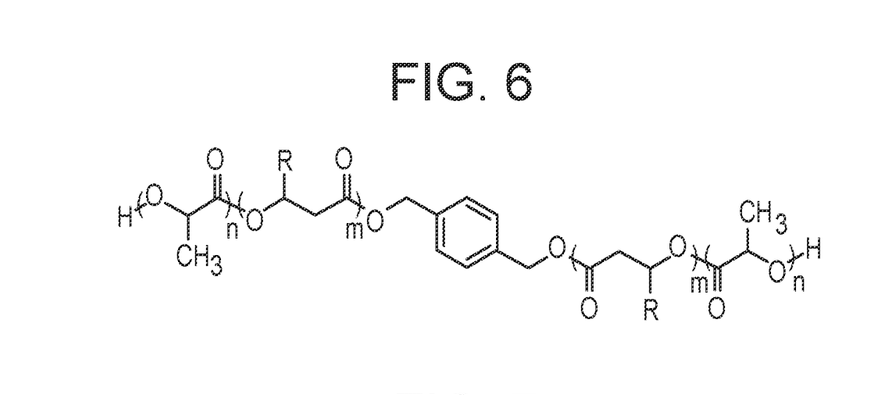
FIG. 6 shows the structure of an exemplary PLA-b-PHA-b-PLA hard-soft-hard triblock copolymer in accordance with the present invention.

In still another embodiment of the invention, such diol-terminated PHA species could also be employed to produce tri-block copolymers. For example, the polymers can serve as diol-macromonomer initiators in ring-opening trans-esterification polymerization (ROTEP) of lactide to provide triblock species with another polymer backbone as end-blocks. Thus, an embodiment of the invention is a triblock copolymer having an A:B:A backbone, wherein block B comprises the residue of the any of the macromolecules described above, and block A selected from the group consisting of polylactic acid, polycaprolactone, polystyrene, polyhydroxybutyrates, PMMA, or polyamides, or copolymers thereof. FIG. 6 is an example in which Block A is a residue of polylactic acid. More generally, block A may be any ring-opened polymerized product of lactide. This includes polylactide copolymers of lactic acid and lactones, such as glycolide and caprolactone. In a preferred embodiment, block A comprises, consists essentially of, or consists of polylactic acid. As will be recognized by one of ordinary skill in the art, reference herein to a polymer in a block structure means the residue of that polymer as it is in the form of a block copolymer.

Figure 7:
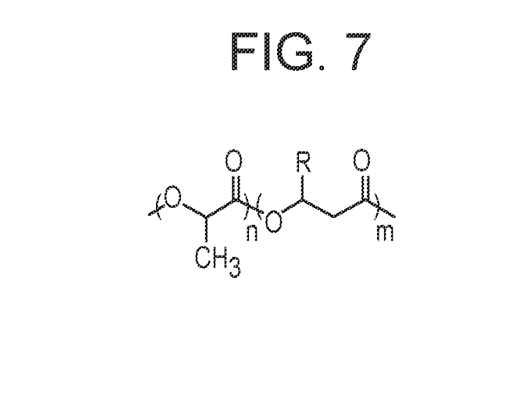
FIG. 7 shows the structure of an exemplary PLA-PHA diblock made by sequential polymerization of monomers in accordance with the present invention.

Alternatively, the triblock systems can be prepared via living ROTEP using a non-diol initiator and sequential monomer addition, as shown in FIG. 7. Similar methods may be employed to produce both di- and multi-block copolymers. Free radical polymerization and other polymerization methods may be used to make the triblock copolymers of the present invention. For example, a hydroxy-terminated macromolecule according to any embodiment of the invention can be used as a macroinitiator, by dissolving it in a solvent along with a catalyst (such as Sn(octyl)$_2$), and DL-lactide in a sealed reaction vessel. The reactants can then be heated under conditions to polymerize the lactide monomers, initiated at the hydroxyl groups at the terminal ends of the macromolecule starting material. After cooling, the reaction product may be precipitated using a solvent to provide the PLA-poly(β-lactone-co-ε-caprolactone)-PLA triblock polymer as shown in FIG. 6. The molar percents of the two blocks may vary over a wide range, with the triblock copolymer comprising 95 to 40 molar percent of the block B and 60 to 5 molar percent of the block A, preferably 95 to 60 molar percent of block B and 40 to 5 molar percent of block A.

The most preferred end-blocks (i.e., referred to herein also as block A) are materials known to display biodegradability or composability like that of the PHA mid-block. The end-blocks should display high modulus values to provide toughness and thermal resistance to the material. In some embodiments, such modulus values may be in the range of $10^6$ to $10^9$ Pa at 20° C. Towards this end, these "hard blocks" can be crystalline in nature displaying melt points, Tm, in the range of 60 to 165° C. Alternatively, the end-blocks may be amorphous species with Tg values ranging from 40 to 200° C. In contrast, the mid-block (i.e., block B) is elastomeric or rubbery and has a lower Tg as indicated above and preferably at most 40° C., preferably at most 30° C., more preferably at most 25° C., and still more preferably at most 0° C., and most preferably at most −20° C., all depending on the needs presented by the ultimate application of the block polymer. If crystalline, block B may have a melting point, Tm, below 30° C., preferably below 25° C.

For optimal performance, the end-blocks are designed to display poor miscibility with the PHA mid-block leading to distinct phases in the block copolymer. Poor miscibility can be demonstrated by the two blocks showing microphase separation, as evidenced by differences in crystallinity and/or distinct glass transition temperatures, Tg, in the DSC. This can be noted by seeing only minor shifts in the Tg values of any signals present in the DCS of the block copolymers (note: if one of the materials is present at low amounts—for example in a 5-90-5 triblock copolymer, end-block signals are typically weak and can't be seen for the lower weight percent fraction). The phase separation is critical in certain applications as it enables the polymer to display the positive features of the individual segments. For example, low modulus at room temperature while still having good thermal resistance or ability to set up quickly and yet still provide creep resistance in an elastic adhesive application. Miscibility can result in the materials displaying compromised properties between those of the individual segments and closer to those of a random copolymer made from the materials. Materials showing good miscibility between blocks may still find utility in hot melt adhesives or in other applications not requiring high tack at room temperature, however.

Block A, such as the PLA end-groups, can be made from various isomers of monomers. For example, the PLA end groups may be made from a racemic mixture of the D- and L-stereoisomers; from lactide monomers consisting essentially of, or consisting of, L-lactide stereoisomers; or from lactide monomers consisting essentially of, or consisting of, D-lactide stereoisomers. The selection of the stereochemistry of the monomers of the end blocks may be based on the desired thermal properties of the block copolymer. The L,L isomer provides crystalline end-blocks, melting in the range of 150-200° C.; polymers from racemic mixtures, on the other hand, are amorphous and display Tg values in the range of 50-70° C.

In embodiments of the invention, the macromolecule of the invention or the triblock copolymer made therefrom are compostable. As used herein, the term "compostable" as applied to an adhesive is an adhesive which meets the requirements of either: (1) the Disintegration Testing as defined by ASTM D 6400-12 (using ISO 20200) (84 day compost exposure) or (2) the Aerobic Biodegradation as defined by ASTM D 6400-12 (using ASTM 5338-15) (at 58±2° C. at 141 days). In other words, the adhesive will reach a minimum of 90% weight loss within 84 days under the Disintegration Testing conditions or will have reached at least 90% carbon conversion (based on $CO_2$ production) within 141 days according to the Aerobic Biodegradation testing as defined by ASTM D 6400-12 (using ASTM 5338-15) (at 58±2° C. at 141 days). In preferred embodiments, the adhesive meets the requirements of both: (1) the Disintegration Testing as defined by ASTM D 6400-12 (using ISO 20200) (84 day compost exposure) and (2) the Aerobic Biodegradation as defined by ASTM D 6400-12 (using ASTM 5338-15) (at 58±2° C. at 141 days).

In terms of molecular weight, the inventive PHA polymers possess a degree of polymerization, m, of anywhere from 20 to 2,000 with number average molecular weights, Mn, of m×MW lactone monomer; as ROTEP is living in nature and gives polydispersity values only slightly above 1, the weight average Mw values will be very close to the Mn. Molecular weight values of the inventive polymers can be determined using a variety of methods including NMR analysis as well as those well-known in the art. Values herein refer to absolute values based on degree of polymerization.

In the case of diol initiated ROTEP, m can be between 10-1000 as branches grow off both sides of the diol. For the hard segments in block copolymers, the degree of polymerization, n, can be between 20-1000.

In terms of block copolymer composition, any combination of m and n values can be used. Most preferred will be those containing 95 to 40 molar percent of the inventive PHA and 60 to 5 molar percent of the "hard" end block segments such that the overall storage modulus (G') of the block copolymer is not substantially higher than $10^6$ Pa at room temperature to maintain tack when formulated. For example, a PLA-PHA-PLA triblock copolymer using the lactone of formula I with $R_1=C_{10}H_{21}$ (MW monomer=184 g/mol) to generate a midblock with a 90,000 g/mol molecular weight (m=489 moles) and two 5,000 g/mol PLA endblocks (n=69 moles for each), the net molar composition would be a 11 mol % PLA-78 mol % PHA-11 mol % PLA.

The inventive PHA polymers and block copolymers can be used in hot met adhesives, HMA, and embodiments of the invention are especially suitable for use in pressure sensitive adhesives. Accordingly, the PHA "soft blocks" may be tailored to provide optimal properties for displaying tack over a range of temperatures. Specifically, the mid-blocks may be designed to have low crystallinity and low modulus values with their highest thermal transition (Tg or Tm) below 40° C. The most preferred inventive PHA materials for use in PSA applications are those that show little crystallinity or are completely amorphous. These may be formed from polymerization of racemic long-chain alkyl lactone monomers along with the β-lactone monomers of formula I. The Tg values for these materials may be below −60° C. Low crystallinity or amorphous mid-blocks are also desirable as they are most likely to be easily plasticized to enable the adhesives to flow readily and wet out surfaces to form strong bonds. They also should display good long-term compatibility with plasticizers and other formulation components, such as tackifiers, used in hot melt and pressure sensitive adhesives.

In accordance with an embodiment of the present invention, a multipurpose hot melt adhesive comprises: 5 to 40 weight percent of a PLA-PHA-PLA triblock copolymer as described herein; 20 to 70 weight percent of a tackifier; 0 to 30 weight percent of a plasticizer, such as castor oil; and 0.1 to 4 weight percent antioxidant. Optional additives (up to 50% by weight) may be incorporated into the hot melt compositions depending on the end use of the composition. Among these additives may be included colorants such as titanium dioxide; fluorescent agents; and fillers such as talc, clay, calcium carbonate, silica, mica, wollastonite, feldspar, aluminum silicate, alumina, hydrated alumina, glass microspheres, ceramic microspheres, thermoplastic micropheres, baryte and wood flour, as well as minor amounts (e.g., less than about 5%) of a wax such as a petroleum derived wax, a synthetic wax or a polyolefin wax. In other embodiments of the invention, adhesive formulations comprising the macromolecule of FIG. 6 can be made by mixing it with the other ingredients, optionally including Sylvalite RE80HP rosin ester as a tackifier, via solution or melt blending. The formulations may include the macromolecule of FIG. 6 to rosin Ester ratios of 20, 40, 60, and 80% tackifier (based the loading of just these two ingredients). In accordance with such embodiments, such hot melt adhesives are suitable for use as both a construction and elastic attachment adhesive for disposable soft goods, such as disposable diapers, feminine sanitary napkins, surgical drapes, hospital pads, and adult incontinent products, and may also be used as tape and label adhesives, and case and carton adhesives, among other uses. The multipurpose hot melt adhesive compositions according to this embodiment have a high level of creep resistance, high bond strength, and relatively low viscosity. Such hot melt adhesives may be applied to substrates using a variety of application techniques. Examples includes hot melt glue gun, hot melt slot-die coating, hot melt wheel coating, hot melt roller coating, melt blown coating, spiral spray and the like. In a preferred embodiment, the hot melt adhesive is sprayed onto a substrate using spiral spray, which is a preferred technique to produce a filamentary spiral pattern for elastic attachment and construction in diaper manufacturing.

In accordance with an embodiment of the invention, a hot melt adhesive comprises: the triblock copolymer described above; the silane-modified, moisture curable polymer made from reacting a macromolecule of the present invention which is a diol with a siloxide; the polyurethane made from reacting a macromolecule of the present invention which is a diol with a diisocyanate; or the (co)polyester made reacting a macromolecule of the present invention which is a diol with a diacid or a diester. Similarly, in accordance with another embodiment of the invention, a pressure sensitive adhesive, which is tacky at room temperature, comprises: the triblock copolymer described above; the silane-modified, moisture curable polymer made from reacting a macromolecule of the present invention which is a diol with a siloxide; the polyurethane made from reacting a macromolecule of the present invention which is a diol with a diisocyanate; or the (co)polyester made reacting a macromolecule of the present invention which is a diol with a diacid or a diester. Such adhesives may further comprise a tackifier, a plasticizer, and, optionally, other additives. Such additives may include, for example, such materials as ultraviolet light (UV) absorbers, waxes, surfactants, inert colorants, titanium dioxide, fluorescing agents and fillers. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour and may be included in an amount up to 60% by weight, and preferably between 1 and 50% by weight.

Embodiments of the invention that use a monomer of Formula I, which is a four-membered ring, would have a higher degree of ester groups along the backbone than macromolecules made from higher lactones, such as a seven-membered ring or higher. Accordingly, an effect of embodiments of the invention is to provide a greater degradation rate because of the higher degree of ester groups along the backbone, and this may be done without unduly compromising adhesive or cohesive strength. Without being bound to any theory, this effect may be due to the increased Van der Waal's forces capable of bonding with substrates, which is also enhanced by having a long-chain alkyl substitution. Embodiments of the present invention would have one long-chain alkyl substituent for every four atoms along the backbone, whereas the macromolecules made from higher lactones (e.g., seven-membered rings) would have only one long-chain alkyl substituent for every seven atoms along the backgone.

Embodiments of the invention are directed to macromolecules made from a monomer of formula I and one or both of monomers of formula II or III. The inclusion of one or two comonomers enables the production of macromolecules having a wider range of melting points and glass transition temperatures so that a more diverse range of macromolecules can be made in accordance with this invention. Consequently, adhesives having a wider range of properties can be made in accordance with this invention. In particular, the ratio of the higher lactone comonomer of formula III to the β-lactone monomer of formula I can be altered to change the melting point and glass transition temperature of the co-polymerized macromolecule relative to the respective individual homopolymers.

In addition, macromolecules of the present invention have a long-chain alkyl substituent. Without being bound to any theory, it is believed that such long-chain alkyl substituents better break up regions of crystallinity to provide a more rubbery macromolecule. When such a macromolecule is used as the mid-block of relatively stiffer end blocks in an ABA pattern, the resulting block copolymer has properties which simulate the properties of many styrene block copolymers used in hot melt adhesives but are not sourced from petroleum fuel and may be compostable if properly formulated.

ASPECTS OF THE INVENTION

Aspect 1. A macromolecule comprising a ring-opened polymerized product of β-lactone monomers of formula I:

(I)

and having a structure of formula IA:

(IA)

and, optionally, β-lactone monomers of formula II:

(II)

and having a structure, when the β-lactone monomers of formula II are present, of the formula IIA:

(IIA)

and, optionally, higher lactone monomers of formula III:

(III)

wherein $X=(CH_2)_a$, or and having a structure, when the higher lactone monomers of formula III are present, of the formula IIIA:

(IIIA)

wherein: (1) at least one of: $R_1'$, if present, is not the same as $R_1$ or $R_2'$, if present, is not the same as $R_2$; (2) $R_2$ is hydrogen or an alkyl group or a substituted alkyl group; (3) $R_2'$, if present, is hydrogen or an alkyl group or a substituted alkyl group; (4) a, if the higher lactone monomers of formula III are present, is at least 3, preferably from 3 to 8, and more preferably from 4 to 7; (5) either m alone or the total of m and m', if the β-lactone monomers of formula II are present, or the total of m and p, if the higher lactone monomers of formula III are present, is between 10 and 10,000, preferably between 20 and 5,000; and (6) one of the following:

a. the macromolecule is not hydroxy-terminated, the β-lactone monomers of the formula II are present, and $R_1$ and $R_1'$ are each independently an alkyl group having at least 8, preferably between 8 and 26, more preferably between 8 and 22 carbon atoms;

b. the macromolecule is not hydroxy-terminated, the β-lactone monomers of the formula II are not present, and $R_1$ is an alkyl group having at least 11, preferably between 12 and 26, and most preferably between 14 and 22 carbon atoms; and c. the macromolecule is hydroxy-terminated and $R_1$ and $R_1'$, if present, are each independently an alkyl group having at least 8, preferably between 8 and 26, more preferably between 8 and 22 carbon atoms.

Aspect 2. The macromolecule of Aspect 1, wherein the macromolecule is hydroxy-terminated and $R_1$ is an alkyl group having at least 8, preferably between 8 and 26, more preferably between 8 and 22 carbon atoms.

Aspect 3. The macromolecule of Aspect 2, wherein the macromolecule is a diol having the following formula IB:

(IB)

(IIC)

wherein D is a hydrocarbon residue from a diol initiator.

Aspect 4. The macromolecule of Aspect 2, wherein the β-lactone monomers of formula II are present and the macromolecule is a diol having the following formula IIB:

wherein BA is a hydrocarbon residue from a polyol initiator having three or more hydroxyl groups and b is at least 3 and preferably between 3 and 6.

(IIB)

wherein D is a hydrocarbon residue from a diol initiator

Aspect 5. The macromolecule of Aspect 2, wherein the higher lactone monomers of formula III are present and the macromolecule is a diol having the following formula IIIB:

Aspect 10. The macromolecule of Aspect 2, wherein the higher lactone monomers of formula III are present and the macromolecule is a polyol having three or more hydroxyl groups and has the following formula IIIC:

(IIIB)

(IIIC)

wherein BA is a hydrocarbon residue from a polyol initiator having three or more hydroxyl groups and b is at least 3 and preferably between 3 and 6.

wherein D is a hydrocarbon residue from a diol initiator.

Aspect 6. The oligomer of any of Aspects 2-5, wherein the diol initiator comprises 1, 4-benzenedimethanol.

Aspect 7. The oligomer of any of Aspects 2-5, wherein the diol initiator comprises a polymer, preferably selected from the group consisting of polyethylene glycol and polypropylene glycol.

Aspect 8. The macromolecule of Aspect 2, wherein the macromolecule is a polyol having three or more hydroxyl groups and has the following formula IC:

(IC)

wherein BA is a hydrocarbon residue from a polyol initiator having three or more hydroxyl groups and b is at least 3 and preferably between 3 and 6.

Aspect 9. The macromolecule of Aspect 2, wherein the β-lactone monomers of formula II are present and the macromolecule is a polyol having three or more hydroxyl groups and has the following formula IIC:

Aspect 11. The macromolecule of any of Aspects 2 or 8-10, wherein the polyol initiator comprises glycerol.

Aspect 12. The macromolecule of any of Aspects 1-11, wherein the β-lactone monomers of formula I consist essentially of a racemic mixture.

Aspect 13. The macromolecule of any of Aspects 1-11, wherein the β-lactone monomers of formula I consist essentially of the R-lactone stereoisomer.

Aspect 14. The macromolecule of any of Aspects 1-11, wherein the β-lactone monomers of formula I consist essentially of the S-lactone stereoisomer.

Aspect 15. The macromolecule of any of Aspects 1, 2, 6, 7, and 11-14, wherein the β-lactone monomers of formula II are present.

Aspect 16. The macromolecule of any of claims 1, 2, 6, 7, and 11-15, wherein the higher lactone monomers of formula III are present.

Aspect 17. The macromolecule of any of Aspects 1-16, wherein the macromolecule has the at least one of the following characteristics:
  a. Low storage modulus $G'<10^6$ from 20-60° C.
  b. High elongation at break values—100-3,000%
  c. Low melting points (Tm<60° C.)
  d. No or low crystallinity
  e. Tg can range from −100 to 60° C.

Aspect 18. A method for making a silane-modified, moisture curable oligomer or polymer comprising reacting the macromolecule of any of Aspects 2-11, wherein the macromolecule is hydroxy-terminated, with a siloxide to form an alkoxysilane-terminated oligomer or polymer.

Aspect 19. A method for making a polyurethane comprising reacting the macromolecule of any of Aspects 2-11, wherein the macromolecule is hydroxy-terminated, with an isocyanate.

Aspect 20. A method for making a (co)polyester comprising reacting the macromolecule of any of Aspects 2-11, wherein the macromolecule is hydroxy-terminated, with a diacid or diester.

Aspect 21. A triblock copolymer having an A:B:A backbone, wherein block B comprises the residue of the macromolecule of any of Aspects 2-11 and block A is a residue of a polymer selected from the group consisting of polylactic acid, polycaprolactone, polystyrene, polyhydroxybutyrates, PMMA, or polyamides or copolymers thereof.

Aspect 22. The triblock copolymer of Aspect 21, wherein block A has a melting temperature (Tm) of above 60° C., preferably between 60° C. and 165° C., if crystalline, and a glass transition temperature ($T_g$) of above 40° C., and preferably between 60° C. and 200° C., if amorphous.

Aspect 23. The triblock copolymer of any of Aspects 21 or 22, wherein block A is immiscible with block B.

Aspect 24. The triblock copolymer of any of Aspects 21-23, wherein block A has a storage modulus (G') from $10^6$ to $10^9$ Pa at 25° C.

Aspect 25. The triblock copolymer of any of Aspects 21-24, wherein the triblock copolymer comprises 95 to 40 molar percent of the block B and 60 to 5 molar percent of the block A, Aspect 26. The triblock copolymer of any of Aspects 21-25, wherein block A is a ring-opened polymerized product of lactide.

Aspect 27. The triblock copolymer of Aspect 26, wherein the polylactic acid is made from a racemic mixture of lactide monomers.

Aspect 28. The triblock copolymer of Aspect 26, wherein the polylactic acid is made from a lactide monomers consisting essentially of L-lactide stereoisomers.

Aspect 29. The triblock copolymer of Aspect 26, wherein the polylactic acid is made from a lactide monomers consisting essentially of D-lactide stereoisomers.

Aspect 30. A hot melt adhesive comprising the triblock copolymer of any of Aspects 22-29; the silane-modified, moisture curable polymer made from the method of Aspect 18; the polyurethane made from the method of Aspect 19; or the (co)polyester made from the method of Aspect 20.

Aspect 31. The hot melt adhesive of Aspect 30 further comprising a tackifier, a plasticizer, and, optionally, other additives.

Aspect 32. A pressure sensitive adhesive comprising the triblock copolymer of any of Aspects 22-29; the silane-modified, moisture curable polymer made from the method of Aspect 18; the polyurethane made from the method of Aspect 19; or the (co)polyester made from the method of Aspect 20.

Aspect 33. The pressure sensitive adhesive of Aspect 32 further comprising a tackifier, a plasticizer, and, optionally, other additives.

Aspect 34. The macromolecule of any of Aspects 1-16, wherein the β-lactone monomers of formula I are non-functionalized and, preferably, the β-lactone monomers of formula II are non-functionalized and/or the higher lactone monomers of formula III are non-functionalized.

Aspect 35. The macromolecule of any of Aspects 1-16 and 34, wherein the β-lactone monomers of formula I are produced by carbonylation of an epoxide.

Prophetic Examples

In a typical synthesis, 1,2-epoxyhexadecane (10 g, 0.042 mol), ClCr(TTP) (7.35×10-3 g, 1.05×10⁻⁵ mol), and Co₂(CO)₈ (5.24×10⁻³, 1.58×10⁻⁵ mol) would be dissolved in THF (125 mL) and placed in a pressure-rated vessel. The vessel would next be flushed with CO (three vent-purge cycles at 25 psi), pressurized to 500 psi with CO, and heated to 70° C. with stirring. The heating would generally take place for several hours and the reaction would be discontinued as pressure in the vessel stopped decreasing. The vessel would then be cooled, vented, and the solvent removed in vacuo to provide the corresponding β-lactone (IV) in ca. 90-99% yield.

(IV)

Polymerization of β-Lactone

Under an argon atmosphere, 1,4-benzenedimethanol initiator, Sn(octyl)₂ catalyst, and β-lactone (IV) would be dissolved in toluene and placed in a pressure-rated vessel. The sealed vessel would next be heated to 110° C. for four to eight hours. After cooling to room temperature, the polymer would be precipitated using cold methanol (−10° C.) which would be collected and dried in vacuo to provide poly(β-lactone) (V) in ca. 80-90% yield. The polymer would be expected to exhibit a Tg<−30° C. with no detectable melt point by differential scanning calorimetry (DSC).

(V)

Synthesis of Hydroxy-Terminated β-Lactone/ε-Caprolactone Copolymers

Under an argon atmosphere, 1,4-Benzenedimethanol initiator, Sn(octyl)₂ catalyst, and β-lactone (IV) and ε-caprolactone (molar ratio of 3-to-C lactone 2:1) would be dissolved in toluene and placed in a pressure-rated vessel. The sealed vessel would next be heated to 110° C. for four to eight hours. After cooling to room temperature, the polymer would be precipitated using cold methanol (−10° C.) and would be collected and dried in vacuo to provide the poly(β-lactone-co-ε-caprolactone) (VI) in ca. 80-90% yield. The structure would be of the composition shown, but with a random comonomer distribution. The copolymer would be expected to exhibit a Tg of ca. −60° C. and a melt point, Tm, in the range of 20-35° C. by differential scanning calorimetry (DSC).

(VI)

Synthesis of PLA-β-Lactone/ε-Caprolactone Block Copolymers

Under an argon atmosphere, the hydroxy-terminated polymer, V, which would be used here as a macroinitiator, Sn(octyl)$_2$ catalyst, and DL-lactide would be dissolved in toluene and placed in a pressure-rated vessel. The sealed vessel would next be heated to 110° C. for four to eight hours. After cooling to room temperature, the resultant block polymer would be precipitated using cold methanol (−10° C.) and would be collected and dried in vacuo to provide the PLA-poly(β-lactone-co-ε-caprolactone)-PLA triblock polymer (VII) in ca. 80-90% yield. The triblock polymer would be expected to exhibit a Tg of ca. −60° C. and a melt point, Tm, in the range of 20-35° C. by differential scanning calorimetry (DSC) associated with the β-Lactone/ε-Caprolactone Block (signals for the PLA block are not expected to be detected owing the relatively low molar concentration in the backbone).

and higher lactone monomers of formula III:

(III)

wherein X=(CH$_2$)$_a$, or (VII)

Generation and Testing of Adhesive Materials

Adhesive formulations consisting of polymer VII along with Sylvalite RE80HP rosin ester would be made via solution or melt blending at VII:Rosin Ester ratios of 20, 40, 60, and 80% tackifier loading. The samples would be melted and coated as 1 mil films to PET then adhered to stainless steel plates. Samples are anticipated to display peel forces between 2 Ncm$^{-1}$ and 10 Ncm$^{-1}$ for all the formulations produced.

and having a structure of formula IIIB:

(IIIB)

wherein: (1) R$_2$ is hydrogen or an alkyl or a substituted alkyl; (2) a is at least 3; (3) the total of m and p is between 10 and 10,000; (4) the macromolecule is a diol and is hydroxy-terminated and R$_1$ is an alkyl having at least 8 carbon atoms; and (5) D is a hydrocarbon residue from a diol initiator.

2. The macromolecule of claim 1, wherein the diol initiator comprises 1,4-benzenedimethanol.

3. The macromolecule of claim 1, wherein the diol initiator comprises a polymer.

4. A method for making a silane-modified, moisture curable oligomer or polymer comprising reacting the macromolecule claim 1 with a siloxide to form an alkoxysilane-terminated oligomer or polymer.

5. A method for making a polyurethane comprising reacting the macromolecule of claim 1 with an isocyanate.

6. A method for making a (co)polyester comprising reacting the macromolecule of claim 1 with a diacid or diester.

7. A triblock copolymer having an A:B:A backbone, wherein block B comprises a residue of the macromolecule of claim 1 and block A is a residue of a polymer selected

We claim:

1. A macromolecule comprising a ring-opened polymerized product of β-lactone monomers of formula I:

(I)

from the group consisting of polylactic acid, polycaprolactone, polyhydroxybutyrates, or polyamides or copolymers thereof.

8. The triblock copolymer of claim 7, wherein block A is amorphous and has a melting temperature ($T_m$) of above 60° C.

9. The triblock copolymer of claim 7, wherein block A is immiscible with block B.

10. The triblock copolymer of claim 7, wherein the triblock copolymer comprises 95 to 40 molar percent of the block B and 60 to 5 molar percent of the block A.

11. The triblock copolymer of claim 7, wherein block A is a ring-opened polymerized product of lactide.

12. A hot melt adhesive comprising the triblock copolymer of claim 7.

13. The hot melt adhesive of claim 12 further comprising a tackifier, a plasticizer, and, optionally, other additives.

14. A pressure sensitive adhesive comprising the triblock copolymer of claim 7.

15. The pressure sensitive adhesive of claim 14 further comprising a tackifier, a plasticizer, and, optionally, other additives.

16. The macromolecule of claim 1, wherein the β-lactone monomers of formula I are non-functionalized.

17. The macromolecule of claim 1, wherein the β-lactone monomers of formula I are produced by carbonylation of an epoxide.

18. The macromolecule of claim 3, wherein the polymer is selected from the groups consisting of polyethylene glycol and polypropylene glycol.

\* \* \* \* \*